United States Patent [19]

Yang

[11] Patent Number: 4,646,884

[45] Date of Patent: Mar. 3, 1987

[54] EXTENDED LIFE GAS SPRING

[75] Inventor: Elmer C. Yang, Orange, Calif.

[73] Assignee: Pacific Scientific Company, Anaheim, Calif.

[21] Appl. No.: 603,627

[22] Filed: Apr. 25, 1984

[51] Int. Cl.⁴ .............................................. F16F 9/43
[52] U.S. Cl. .............................. 188/322.21; 267/64.28
[58] Field of Search .................... 188/269, 314, 322.21; 267/64.28

[56] References Cited

U.S. PATENT DOCUMENTS

| 2,774,446 | 12/1956 | de Carbon | 188/269 |
|---|---|---|---|
| 2,823,915 | 2/1958 | Bourcier De Carbon . | |
| 2,873,963 | 2/1959 | Taylor . | |
| 3,047,040 | 7/1962 | Gross . | |
| 3,750,855 | 8/1973 | Peddinghaus | 188/314 X |
| 3,879,023 | 4/1975 | Pearce et al. . | |
| 3,904,182 | 9/1975 | Allinquant et al. . | |
| 4,044,866 | 8/1977 | Ishida | 188/322.21 |

FOREIGN PATENT DOCUMENTS 956918  4/1964  United Kingdom ............... 188/314

Primary Examiner—Duane A. Reger
Attorney, Agent, or Firm—Knobbe, Martens, Olson & Bear

[57] ABSTRACT

A pressurized gas spring having an extended useful operating life is provided. The cylinder is pressurized with a gas that exists in a gas-liquid phase equilibrium at the operating temperatures and pressures of the gas spring. The liquid within the cylinder promptly converts to the gaseous form upon any reduction in pressure within the cylinder. The equilibrium pressure between the liquid and gas phases assures constant cylinder pressure regardless of the gradual, normal leakage of gas from the cylinder, and the cylical changes in volume within the cylinder due to the reciprocating action of the piston rod during operation of the gas spring.

9 Claims, 4 Drawing Figures

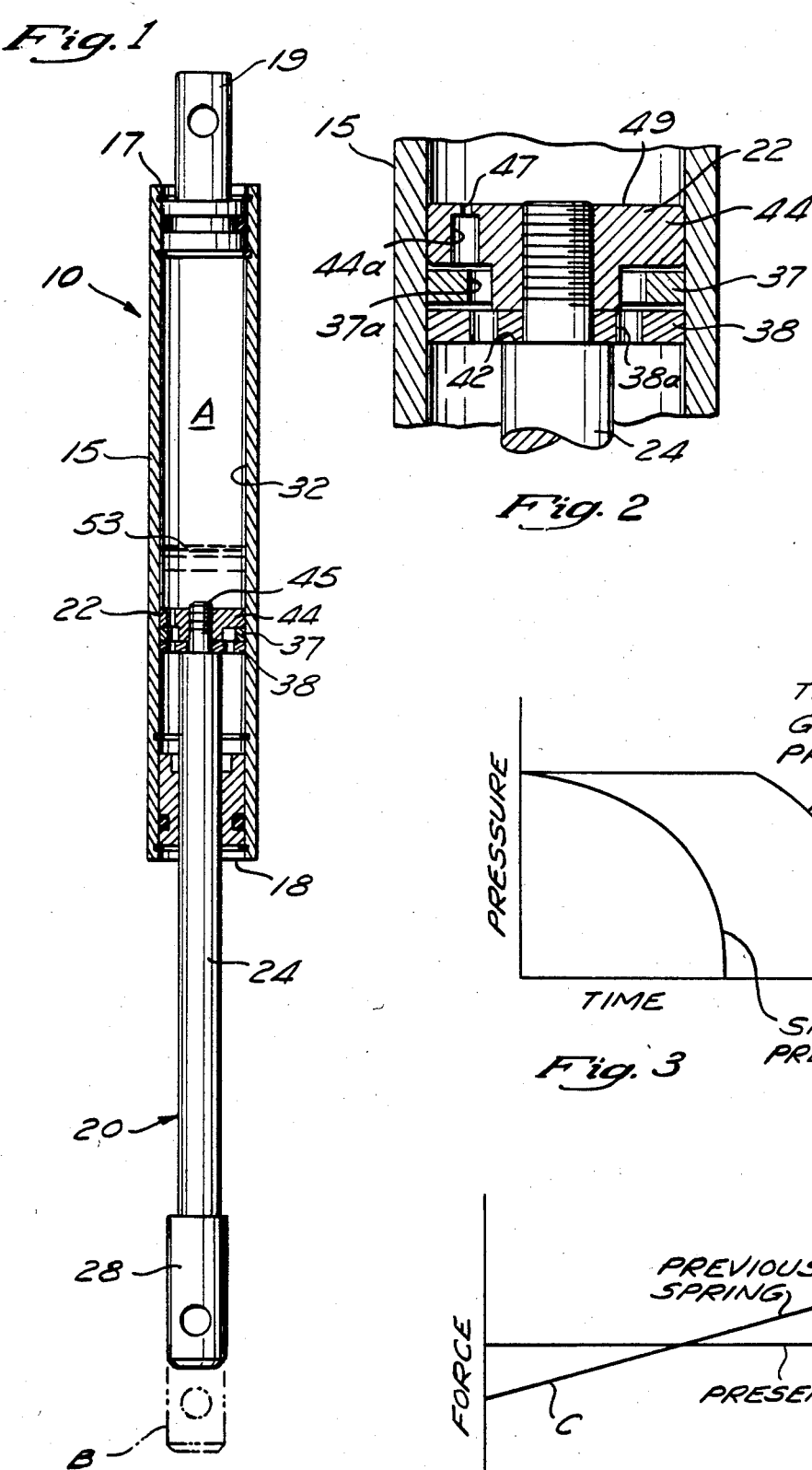
Fig. 1
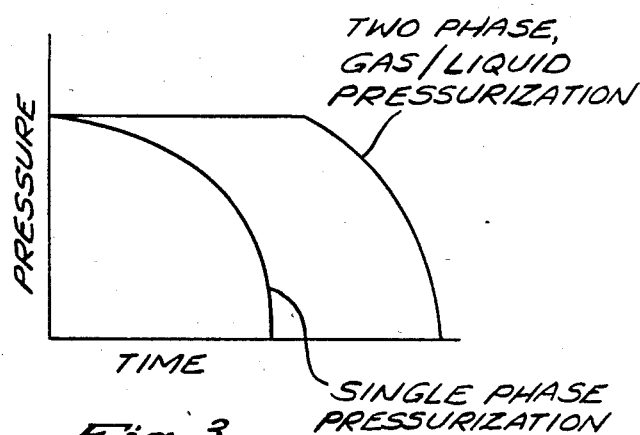
Fig. 2
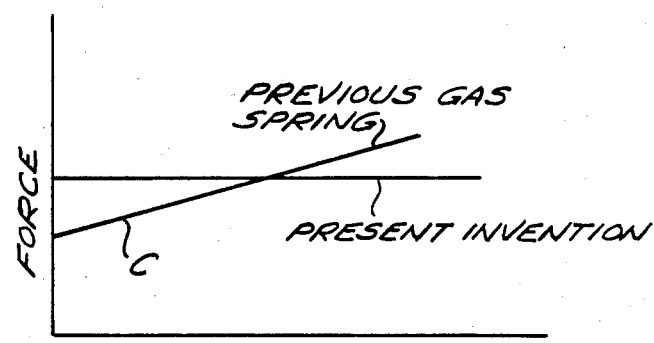
Fig. 3
Fig. 4

EXTENDED LIFE GAS SPRING

BACKGROUND OF THE INVENTION

1. Field of the Invention

The present invention relates to pressure-activated cylinders, and more particularly to such cylinders known as gas springs, which utilize contained gas pressure to provide the lifting, lowering, moving and adjusting forces previously provided by the more complex and bulkier mechanical spring construction.

2. Description of the Prior Art

Since their introduction in the 1960's, gas springs have become recognized by industrial designers worldwide as an effective design alternative in many separate applications to the formerly used mechanical devices of greater complexity and cost. A gas spring essentially consists of a pressurized cylinder having a support rod extending therefrom. The support rod forms part of a reciprocating piston assembly, with an attached piston, or, more accurately, guide head remaining within the pressurized cylinder. A gas seal is formed at one end of the cylinder around the support rod, permitting the support rod to follow the guide head movement within the cylinder while preventing loss of pressurization. During operation, the pressurization within the cylinder acts upon the cross-sectional area of the support rod, forcing the guide head against the sealed end of the cylinder, fully extending the support rod from the cylinder. Retraction of the rod will thereafter occur upon application of a sufficient force against the rod to overcome the cylinder pressurization force. The rates of extension and retraction can be regulated by the design of the guide head and the manner of head engagement with the inner cylinder walls.

The speed and force applied by the advancing piston assembly can also be controlled by the selective location of the points for attaching the gas spring to the moveable structure, thereby generating specific leverage and/or moment arms to interact with the force supplied by the gas spring. A wide range of applied forces can thereby be obtained from a single, interchangeable model of gas spring. The compact nature of the gas spring along with the relative mechanical simplicity of achieving a specific applied force has led to the wide-spread use of gas springs in a variety of applications. Gas springs are commonly found on passenger cars, raising and supporting both the trunk lid and the engine hood. Commercial vehicles such as buses and airlines often use them for opening and supporting door panels to baggage storage areas and for other types of maintenance access panels. Gas springs are also to be found in office photocopy machines, either for providing access to the mechanized parts or for supporting the paper feed unit. In all of these applications, the gas spring provides a compact and simple mechanism for the controlled lifting and supporting of structural weight.

Gas springs, like their mechanical counterparts, will eventually wear out. Failure of gas springs occurs when pressurization of the cylinder is lost or, as is more frequently the case, falls below the level necessary to support the moveable structure. Loss of pressurization will typically occur due to gas leakage from around the piston rod seal. Seal failure is a normal consequence of the wear placed upon the seal by the repeated in and out movements of the piston rod. This normal rate of wear, however, will be greatly accelerated when the gas spring is placed in a dirty environment. An abrasive coating is formed on the extended piston rod by dirt and other contaminants, which increases the normal wear placed on the seal when the piston rod again retracts into the cylinder. However, in either case, movement of the piston rod will eventually abrade the seal sufficiently to permit the gradual escape of the pressurizing gas.

In an attempt to prolong the life of gas springs, manufacturers have selected charging gases of heavier molecular weights in order to reduce the rate of diffusion from the cylinder. However, the manufacturers must also remain concerned about the toxicity of gas employed, and the increased material costs associated with the heavier gases. Attempts have also been made to improve the mechanical seal surrounding the piston arm.

The foregoing improvements have, to some extent, extended the life of gas springs. However, gas leakage around the seal remains an inevitable, ultimate cause of their failure. The concept of refilling the cylinders to replace lost gas has almost uniformly been rejected by the manufacturers, since the labor costs of performing the refilling operation would exceed the cost of replacing the gas spring. Moreover, the rate of gas leakage will increase over the life of the gas spring as the seal wears out, and a refilled cylinder would have a reduced operating life-necessity another repair or replacement operation and addition labor costs.

SUMMARY OF THE INVENTION

The present invention has as an underlying objective the improvement in the known types of gas springs by providing a reservoir of charger gas within the cylinder to replace the gas lost through leakage. The useful life of the cylinder is extended by drawing upon this gas reservoir, and thereby maintaining sufficient pressure within the cylinder to continue operation.

This goal is inventively achieved by selecting a gas that forms a gas/liquid phase equilibrium at the desired operating pressures and temperatures of the cylinder. A liquid phase reservoir of the gas is created by overcharging the cylinder sufficiently to obtain both the gas and liquid phases of the charging gas. The gas/liquid phase equilibrium will then maintain the cylinder at the partial pressure of the charging gas, with additional gas evaporating from the liquid to replace any gas lost through leakage from the cylinder.

The structure or hardware from conventional gas spring cylinder may be used to practice the present invention. Just prior to sealing the cylinder, an oversupply of the charging material is placed within the cylinder, normally in a condensed form—either solid or liquid. Evaporation will then occur within the closed cylinder until a phase equilibrium between the gas and liquid phases is achieved. The charging material is so selected that the equilibrium pressure satisfies the mechanical operating requirements for the gas spring. The expected environmental conditions, particularly temperature and pressure ranges, must also be taken into account when selecting the changing material. The amount of liquid gas at the original equilibrium is chosen so as to not interfere with the reciprocating operation of the piston within the cylinder.

The inventive utilization of the gas/liquid phase equilibrium in supplying a gas spring cylinder with a future supply of charging gas provides a gas spring having a longer service life. In addition, and perhaps even more importantly, the constant pressure maintained by the gas/liquid phase equilibrium provides the gas spring with a virtually constant spring rate—an achievement not possible with the previous gas springs due to pressure variations caused by a fixed amount of gas undergoing changes in volume caused by the in and out movement of the support rod. In the present invention, condensation or evaporation maintains a constant pressure during these volumetric changes. Obtaining this constant spring rate is of great value to mechanical engineers when designing a system requiring a spring function.

Various other objects, advantages, and features of the present invention will become readily apparent from the ensuing detailed description, and the novel features will be particularly pointed out in the appended claims.

BRIEF DESCRIPTION OF THE DRAWINGS

FIG. 1 is a perspective view with portions in cross-section, showing a gas spring with the guide rod partially extended, (and fully-extended in phantom);

FIG. 2 is a close-up perspective view showing the guide head of FIG. 1 in cross-section;

FIG. 3 is a graph illustrating the general relationships over time between the internal cylinder pressures of the present invention and the previous gas spring cylinders; and FIG. 4 is a graph illustrating the general relationships between the present gas spring and the previously used systems with regard to changes in applied force over the length of the piston stroke.

DESCRIPTION OF THE PREFERRED EMBODIMENT

FIG. 1 shows a conventionally constructed gas spring 10 of the type used in wide variety of applications. The gas spring consists essentially of two parts, a pressure cylinder 15 with a reciprocating piston assembly 20 engaged therewith. The pressure cylinder 15 is provided with a closed end 17 and a sealed end 18 that interacts to form a slideable seal with a portion of the piston assembly 20. A cylinder connector 19 is formed or attached to the closed end 17, and is utilized for connecting the pressure cylinder 15 to the structure with which the gas spring 10 will be used.

The piston assembly 20 consists of a guide head 22 connected to a first end of a piston rod 24. A piston rod connector 28 is formed on a second end of the piston rod 24, and, like the cylinder connector 19, is used to form a connection with the device having the moveable structure (not shown) with which the gas spring 10 is being used.

A cylinder wall 32 is formed within the pressure cylinder 15 and slideably receives the guide head 22. As is shown by FIG. 2, the guide head 22 consists of a pair of guide rings 37, 38 and a sealing end cap 44. The end cap 44 is received by a threaded portion 45 of the piston rod 24, and secures the guide rings 37, 38 against a shoulder 42 formed on the piston rod 24. When assembled, a series of passageways 37a, 38a, 44a through the various component parts are formed in the guide head 22 to provide a damping action in association with lubricating oil within the pressure cylinder 15. Although the guide head 22 does not form a sealed engagement with the cylinder wall 32, the passageways 37a, 38a, 44a also assist in the equalization of gaseous pressure on either side of the guide head 22. A relief opening 47 is formed in a front face 49 of the end cap 44 and communicates with the passageways 37a, 38a, 44a. There is only a minimum amount of lubricating oil within the pressure cylinder 15, however, the relief opening 47 provides an opening through which the oil can escape when the piston assembly 20 is in its fully-extended position, denoted by reference letter B.

The operation of a gas spring, whether or not practicing the present invention, is based upon differences in gaseous pressure between the interior portions of the pressure cylinder 15, generally denoted by reference letter A, and the air pressure of the surrounding environment, normally atmospheric. This pressure differential acts upon the cross-sectional area of the piston rod 24, (as viewed from the interior of the pressure cylinder 15), causing it to move outwardly from the pressure cylinder 15.

The conventionally-charged gas springs are subject to two types of pressure-drop related problems during operation, the first leading ultimately to spring failure. Over time, the seals located within the sealed end 18 fail, permitting the pressurized gas in the interior portion A, to gradually escape from the cylinder 15. Failure of the gas spring inevitably follows. This is illustrated in FIG. 3.

The second type of pressure drop is not symptomatic of the spring's ultimate failure, but does affect performance of the unit. In a conventionally-charged gas spring, the inward retraction of the piston rod 24 causes an increase in pressure within the cylinder 15 due to the effective decrease in the internal volume of the cylinder, in an amount equal to the volume now occupied by the piston rod 24. This increase in pressure causes a corresponding increase in the force supplied by the moving piston rod 24, and thus, the gas spring does not provide a constant spring rate. This increase in force is graphically depicted in FIG. 4, as line C.

Under the present invention, the amount of charging gas introduced into the pressurized cylinder is significantly increased, preferably by a factor of from 3-8 (by volume, depending upon working temperature) from the pressurized cylinders previously employed by the gas springs. Over-pressurization of the cylinders is avoided by selecting the proper charging material to obtain a two phase system within the pressurized cylinder at the required operating temperatures. This two-phase system is illustrated in FIG. 1 by a gas/liquid level 53. The internal pressure of the cylinder will be maintained at the vapor pressure of the charging material so long as both phases are present. Neither the gradual leakage of gas from the cylinder nor the volumetric changes within the cylinder due to movement of the piston rod will cause a change in the internal pressure of the cylinder. The tendency of the gas spring to maintain this constant pressure is graphically illustrated in both FIGS. 3 and 4.

Achieving this desired stability, requires the selection of a charging material having a vapor pressure within suitable pressures for operating gas springs, and a sufficiently high initial temperature to permit a two-phase system to exist at the expected operating temperatures for the gas spring. (Water would be a satisfactory material in a working environment of 300° F.) By way of example and not by way of limitation, carbon dioxide, ammonia, and nitrous oxide are suitable materials within this operating range. However, the tendency of gas springs to leak makes the use of both ammonia and nitrous oxide inadvisable for most applications. The favorable toxicity and inflammability properties of carbon dioxide makes it the material of preference.

In additional to its other benefits, the ready supply of carbon dioxide in liquid and in solid form, dry ice, provides storage advantages and enables the use of a simplified method for charging the pressure cylinder. After the cylinder and piston apparatus have been assembled, but prior to sealing the cylinder, a pre-selected quantity of carbon dioxide—liquid or solid—is placed inside of the cylinder. Sealing is then completed and pressurization occurs upon the gradual sublimation and liquefaction of the carbon dioxide. For an example, to achieve a final pressure of approximately 900 p.s.i. in a cylinder having a volume of 1.26 in$^3$, it has been found that $2\frac{1}{2}$ to $9\frac{1}{2}$ grams of carbon dioxide will create a spring that provides constant pressure in accordance with the present invention. Regardless of cylinder size, the filling percent of carbon dioxide should never exceed 68%. (Filling percent may be defined as the ratio of the weight of the carbon dioxide placed in the cyliinder to the weight of water it would require to fill the container. If, for example, it required 1 kg of water to fill a cylinder, the amount of $CO_2$ placed inside of the cylinder could not exceed 680 grams.) Additional filling beyond the 68% level significantly increases the risk of over-pressurization and explosive failure of the pressure cylinder.

When utilizing carbon dioxide, so long as the cylinder temperature remains below the critical temperature of $CO_2$, 88° F. (31.1° C.), both the gas and liquid phases will be present. The increased density of the liquid enables the storage of significantly more carbon dioxide than would be the case if only gas were present. The effective increases in cylinder volume obtained over a number of different temperatures and filling percentages of $CO_2$ are set forth in Table I, below. T,0100

The values in Table I were calculated using the ideal gas law relationship $PV=nRT$. This equation was solved for V (Volume), and the values of n (the number of moles of gas) were obtained by multiplying the volume of the cylinder by the filling percent and dividing the product by the molecular weight of carbon dioxide, 44.01. Carbon dioxide may not be an ideal gas, particularly around its critical temperature, however, the data in Table I is believed useful for indicating the significant increase in effective cylinder volume obtained by making use of this two-phase system. For example, at a filling percent of 65, and at an operating temperature of 70° F. (21° C.), the two-phase system of $CO_2$ provides an effective increase in volume of gas within the cylinder of 6.25 times the amount of gas necessary to fill the cylinder at that temperature.

While I have disclosed an exemplary structure and charging material to illustrate the principles of the present invention, it should be understood that I wish to embody within the scope of the patent warranted hereon, all such modifications as reasonably and properly come within the scope of my contribution to the art.

I claim:

1. A gas spring providing an extended service life comprising:

a pressure cylinder;

a piston rod slidably received within said cylinder, having a fully extended position, and projecting from the pressure cylinder through a sealed opening therein; and a charging material within the pressure cylinder biasing said piston rod towards said fully extended position, said charging material existing in a reversible liquid and gaseous phase equilibrium within the pressure cylinder, whereby the liquid and gaseous phase equilibrium of the charging material maintains a substantially constant pressure or biasing force on said piston rod notwithstanding volumetric changes within said cylinder due to the extension and retraction of the piston rod.

2. A gas spring as described in claim 1, wherein said charging material remains in both a liquid and gaseous state over a range of operating temperatures for the gas spring.

3. An improved gas spring for use in providing lifting and adjusting forces of the type having a reciprocating piston assembly located within a pressurized cylinder, having a piston rod projecting therefrom in a slidable, sealed arrangement, wherein the improvement comprises:

a charging material in reversible gas-liquid phase equilibrium within the pressurized cylinder applying a substantially constant biasing force against said reciprocating piston assembly, independent of the piston assembly location within said cylinder, whereby pressurization of the cylinder is maintained at the phase equilibrium pressure regardless of charging gas leakage from the cylinder or internal changes in cylinder volume.

4. An improved gas spring as described in claim 3, wherein the charging material is a gas selected from the group consisting of: ammonia, carbon dioxide, and nitrous oxide.

5. An improved method for charging a pressure cylinder in a gas spring comprising:

selecting a charging material having a vapor pressure within a range of pressure sufficient for operation of a gas spring by applying a biasing force on a piston assembly thereof; and placing an amount of said charging material in the pressure cylinder, said amount sufficient to establish reversible phase equilibrium between a gas and liquid phase of said charging material within the pressure cylinder during the operation thereof, whereby a liquid reservoir of charging material is formed within the pressure vessel, automatically maintaining the operating pressure by replacing any gaseous charging material lost through leakage or otherwise needed due to volumetric changes within the pressure cylinder during operation.

6. An improved method for charging a pressure cylinder as described in claim 5 wherein the charging material is a gas selected from the group consisting of: ammonia, carbon dioxide, and nitrous oxide.

7. An improved method for charging a pressure cylinder as described in claim 5, wherein the charging material is carbon dioxide.

8. An improved method for charging a pressure cylinder as described in claim 7, wherein said carbon dioxide is placed in a pressure vessel in a quantity not exceeding a filling percentage of 68% of the water weight of the pressure cylinder.

9. An improved method for charging a pressure cylinder as described in claim 7, wherein the carbon dioxide is placed in said pressure cylinder in the form of dry ice.

* * * * *